3,342,800
BENZOTHIAZOLE MONOAZO DYES

Jack L. Towle, East Cleveland, and John A. Zelek and George R. Pellon, Cleveland, Ohio, assignors, by mesne assignments, to Kewanee Oil Company, Bryn Mawr, Pa., a corporation of Delaware
No Drawing. Original application June 26, 1962, Ser. No. 205,217. Divided and this application Dec. 13, 1963, Ser. No. 330,233
13 Claims. (Cl. 260—158)

The application is a divisional application of Ser. No. 205,217, filed June 26, 1962, now abandoned.

This invention relates to azo dyes. More particularly the invention relates to azo dyes having good dischargeability.

It has been discovered that the azo compounds having the general formula:

(I)
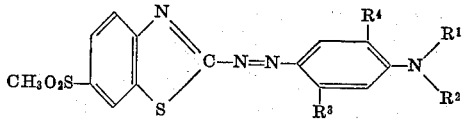

wherein $R^1$ represents a member selected from the group consisting of H, an alkyl group, an aryl group, or a carbamylalkyl group and $R^2$ represents a carbamylalkyl group. $R^3$ and $R^4$ represent a lower alkyl group, a methoxy group, a halogen atom, or an H atom; have particular utility as dischargeable dyes.

The azo compounds of the instant invention are prepared by diazotizing a 2 - amino - 6 - methylsulfonylbenzothiazole having the formula (II)
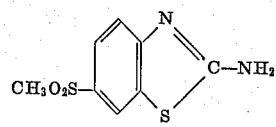

and coupling these diazonium compounds with compounds having the following general formula:

(III)
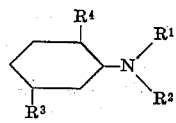

where $R^1$, $R^2$, $R^3$, and $R^4$ are H, alkyl, aryl, or carbamylalkyl and $R^2$ represents carbamylalkyl. $R^3$ and $R^4$ can be a lower alkyl, methoxy, halogen or hydrogen. X can be H, lower alkyl or aryl.

In order to illustrate our invention the following examples are given by way of illustration and not by way of limitation. All parts and percentages are by weight when specified.

The coupling agents advantageously used in preparing the dyestuffs of the present invention are prepared in the manner indicated by the following examples:

Example I

N - ethyl-β-cyanoethyl-m-toluidine (75.3 grams) was slowly added with vigorous stirring to 220 ml. of concentrated sulfuric acid keeping the temperature at 20–25° C. by external cooling. The solution was allowed to stand a total of 40 hours at room temperature before pouring with gentle agitation onto 660 grams of crushed ice. Neutralization of the resulting solution with ammonium hydroxide precipitated the crude product which was readily purified by a char treatment in hot aqueous methanol. The N - ethyl - N - β - carbamylethyl-m-toluidine melted at 57–59° C.

Example II

N,N - bis(β-cyanoethyl)-m-toluidine (30 grams) was slowly added with vigorous stirring to 180 ml. of concentrated sulfuric acid keeping the temperature at 20–25° C. by external cooling. The solution was then kept at room temperature for 60 hours, filtered, and poured with stirring onto 640 grams of crushed ice. Neutralization of the resulting solution with ammonium hydroxide precipitated N,N - bis(β-carbamylethyl)-m-toluidine as a white crystalline solid which melted at 153–155° C.

Example III

N,N-bis(β-cyanoethyl) aniline (30 grams) was slowly added with vigorous stirring to 180 ml. of concentrated sulfuric acid, keeping the temperature at 20–25° C. by external cooling. After the initial exothermic reaction subsided, the solution was allowed to stand at room temperature for 64 hours. The reaction mixture was then filtered and the filtrate was poured with stirring onto 640 grams of crushed ice and the N,N-bis(β-carbamylethyl) aniline was precipitated by neutralization with ammonium hydroxide. The granular white product melted at 152–154° C. Recrystallization from 95% ethanol gave a product melting at 154.5–155.5° C. The elemental analysis of the product is as follows:

Calculated for $C_{12}H_{17}N_3O_2$: C, 61.4%; N, 17.8%; H, 7.2%. Found: C, 61.39%; N, 17.60%; H, 7.18%.

Example IV

N,N - bis(β-carbamylethyl)-m-chloroaniline was prepared from N,N - bis(β - cyanoethyl)-m-chloroaniline in accordance with the procedure in Example II. The product was obtained as off-white needles melting at 163–165° C.

Diazotized 2 - amino - 6 - methylsulfonylbenzothiazole was coupled to N - ethyl-N-carbamylethyl-m-toluidine according to the following procedure:

Example V 116 grams concentrated sulfuric acid was diluted with 4.2 grams of ice, cooled to 30° C. and 6.8 grams of 2-amino - 6 - methylsulfonylbenzothiazole was added and stirred until solution was effected. Then 2.14 grams of sodium nitrite was added at 20–25° C. and the solution stirred for 30 minutes. After cooling to 12–18° C., 66 grams of ice was added to further reduce the temperature to 2–6° C. The solution was stirred for an additional hour and then urea was added to destroy excess nitrous acid. The diazo was slowly added at 0–5° C. to a solution of N-ethyl - N - β - carbamylethyl-m-toluidine in dilute hydrochloric acid and stirred for two hours at 0–5° C. Pouring into water caused the dye to precipitate from solution. Is was separated by filtration and washed with water. It has the following structure.

(IV)
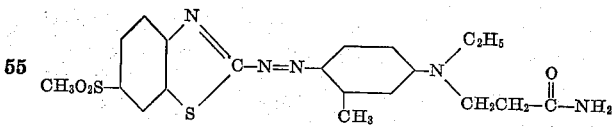

It colors cellulose acetate textile materials red shades which have excellent fastness to light and gas, and excellent discharge properties.

Example VI

N,N - bis(β - carbamylethyl)-m-toluidine was similarly coupled with diazotized 2 - amino - 6 - methylsulfonylbenzothiazole, as in Example V, to obtain a dye which colors cellulose acetate textile materials red shades which have excellent fastness to light and gas, and excellent discharge properties.

Example VII

Coupling N,N - bis(β - carbamylethyl) aniline with the diazo of 2 - amino - 6 - methylsulfonylbenzothiazole in accordance with the general procedure described in Example V forms a dye compound. It colors cellulose acetate textile materials red shades having excellent fastness properties. The dye is also easily dischargeable to pure white shades.

Example VIII

The coupling component N,N - bis(β - carbamylethyl) m-chloroaniline, was reacted with the diazo of 2 - amino-6 - methylsulfonylbenzothiazole in accordance with the procedure in Example V. The dye compound obtained, colors cellulose acetate textile materials red shades.

Example IX

Diazotization of 2 - amino - 6 - methylsulfonylbenzothiazole and coupling with N - β-carbamylethyl-m-chloroaniline was carried out in accordance with Example V. The dye compound obtained, colors cellulose acetate textile materials red shades having good discharge and fastness properties.

Example X

N - β - carbamylethyl-o-chloroaniline so obtained was also coupled with diazotized 2 - amino - 6-methylsulfonylbenzothiazole. The resulting material dyes cellulose acetate textile materials red shades which have excellent fastness to light and gas, and excellent discharge properties.

Example XI

Following the general method of Example I, N-phenyl-N-carbamylethyl-aniline was coupled with the diazo of 2-amino - 6 - methylsulfonylbenzothiazole. The material produced colors cellulose acetate textile materials red shades.

Exmple XII

Coupling N,N-bis(β-carbamylethyl)-m-anisidine with the diazo compound of 2-amino-6-methylsulfonylbenzothiazole forms a dye that colors cellulose acetate textile materials reddish-violet shades. These colors exhibit excellent fastness and dischargeability.

Example XIII

When diazotized 2 - amino-6-methylsulfonylbenzothiazole is coupled to N-β-carbamylethyl-m-anisidine a dye compound is formed which colors cellulose acetate textile materials reddish-violet shades which have excellent fastness and discharge properties.

Example XIV

N-β-carbamylethyl-o-anisidine when coupled with diazotized 2-amino-6-methylsulfonylbenzothiazole gives a dye which colors cellulose acetate textile materials reddish-violet shades which have excellent fastness to light and gas, and excellent discharge properties.

Example XV

Following the diazotization and coupling procedure of Example V, diazotized 2-amino - 6 - methylsulfonylbenzothiazole was coupled with N-β-carbamylethyl-2-methoxy-5-methylaniline to obtain a dye which colors cellulose acetate textile materials reddish-violet shades.

While specific examples of the invention have been set forth hereinabove, it is not intended that the invention be limited solely thereto, but to include all of the variations and modification falling within the scope of the appended claims.

What is claimed is:
1. Azo compounds of the general formula

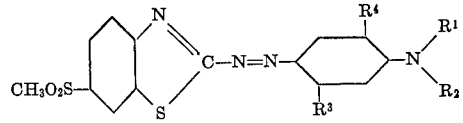

wherein $R^1$ represents a member selected from the group consisting of H, lower alkyl, phenyl, and carbamylethyl; $R^2$ represents carbamylethyl, $R^3$ and $R^4$ represent radicals of the class consisting of lower alkyl, methoxy, chlorine, and H.

2. The azo compound having the formula:

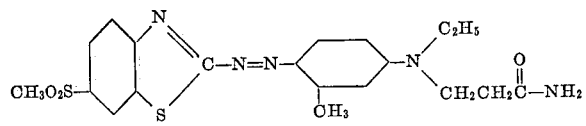

3. The azo compound having the formula:

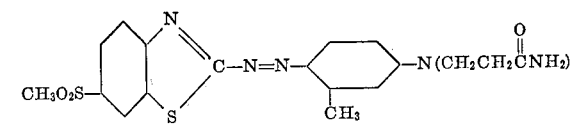

4. The azo compound having the formula:

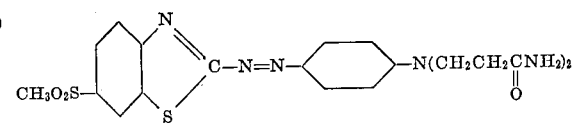

5. The azo compound having the formula:

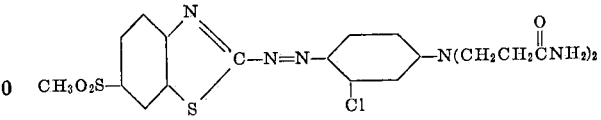

6. The azo compound having the formula:

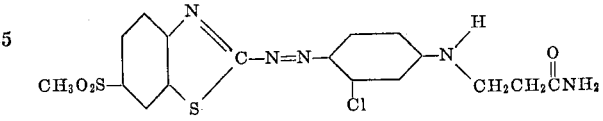

7. The azo compound having the formula:

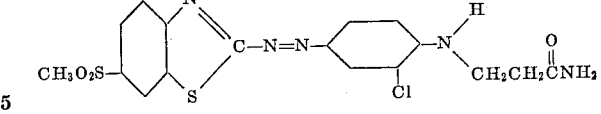

8. The azo compound having the formula:

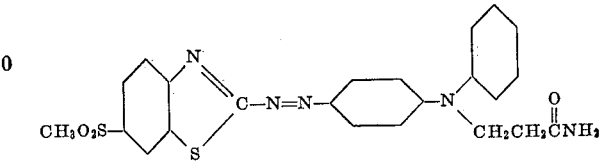

9. The azo compound having the formula:

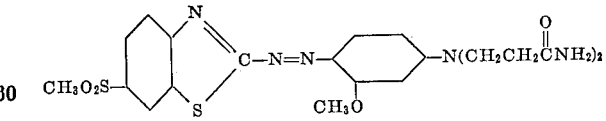

10. The azo compound having the formula:

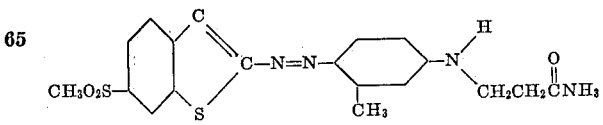

11. The azo compound having the formula:

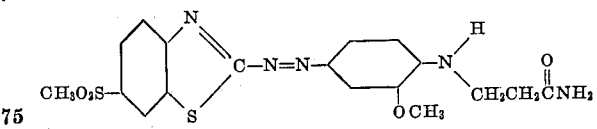

12. The azo compound having the formula:
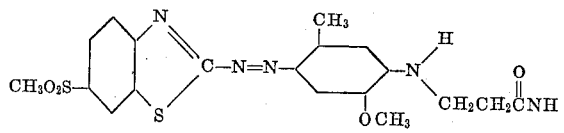
13. The azo compound having the formula:
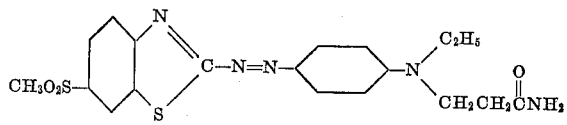
References Cited
UNITED STATES PATENTS
| 2,346,013 | 4/1944 | Dickey | 260—158 X |
| 2,785,157 | 3/1957 | Straley et al. | 260—158 |
| 3,084,153 | 4/1963 | Fishwick et al. | 260—158 |
FOREIGN PATENTS
| 787,369 | 12/1957 | Great Britain. |
| 894,012 | 4/1962 | Great Britain. |
CHARLES B. PARKER, *Primary Examiner.*
D. PAPUGA, *Assistant Examiner.*

UNITED STATES PATENT OFFICE
CERTIFICATE OF CORRECTION

Patent No. 3,342,800                      September 19, 1967

Jack L. Towle et al.

It is hereby certified that error appears in the above numbered patent requiring correction and that the said Letters Patent should read as corrected below.

Column 4, lines 64 to 68, for the left-hand portion of the formula reading

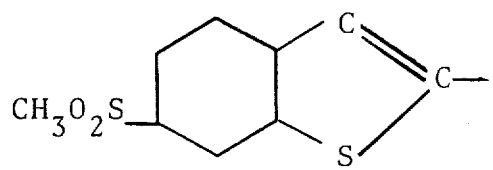 read 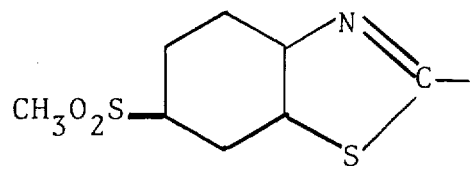

column 5, lines 2 to 6, for the right-hand portion of the formula reading

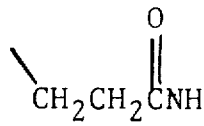 read 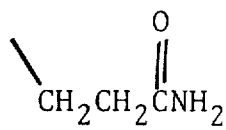

Signed and sealed this 24th day of September 1968.

(SEAL)
Attest:

EDWARD M. FLETCHER, JR.                EDWARD J. BRENNER
Attesting Officer                      Commissioner of Patents